United States Patent
Klose et al.

(10) Patent No.: US 12,265,022 B2
(45) Date of Patent: Apr. 1, 2025

(54) THZ MEASURING DEVICE AND THZ MEASUREMENT METHOD FOR MEASURING TEST OBJECTS, IN PARTICULAR PIPES

(71) Applicant: CiTEX Holding GmbH, Melle (DE)

(72) Inventors: Ralph Klose, Melle (DE); Jörg Klever, Halle (DE)

(73) Assignee: CiTEX Holding GmbH, Melle (DE)

( * ) Notice: Subject to any disclaimer, the term of this patent is extended or adjusted under 35 U.S.C. 154(b) by 209 days.

(21) Appl. No.: 18/024,651

(22) PCT Filed: Sep. 15, 2021

(86) PCT No.: PCT/DE2021/100761
§ 371 (c)(1),
(2) Date: Mar. 3, 2023

(87) PCT Pub. No.: WO2022/057980
PCT Pub. Date: Mar. 24, 2022

(65) Prior Publication Data
US 2023/0314315 A1    Oct. 5, 2023

(30) Foreign Application Priority Data
Sep. 15, 2020   (DE) .......................... 102020123992.0

(51) Int. Cl.
*G01N 21/35*    (2014.01)
*G01B 11/06*    (2006.01)
(Continued)

(52) U.S. Cl.
CPC ......... *G01N 21/3563* (2013.01); *G01B 11/06* (2013.01); *G01N 21/3581* (2013.01)

(58) Field of Classification Search
CPC . G01N 21/3563; G01N 21/3581; G01B 11/06
See application file for complete search history.

(56) References Cited

U.S. PATENT DOCUMENTS

| | | |
|---|---|---|
| 10,514,336 B2 | 12/2019 | Thiel |
| 2020/0173766 A1 | 6/2020 | Thiel |

(Continued)

FOREIGN PATENT DOCUMENTS

| | | |
|---|---|---|
| DE | 202016008526 | 5/2018 |
| DE | 202016008526 U1 | 5/2018 |

(Continued)

OTHER PUBLICATIONS

International Search Report and Written Opinion for PCT/DE2021/100761 dated Dec. 8, 2021.
(Continued)

*Primary Examiner* — Hugh Maupin
(74) *Attorney, Agent, or Firm* — Barnes & Thornburg LLP

(57) ABSTRACT

The invention relates to a THz measuring device (2) for measuring a test object (8), in particular a pipe (8), including
a first THz transceiver (3) which outputs a first THz beam (10) with a first polarization plane along an optical axis (A) through a measuring chamber (7),
a first polarization mirror (4) designed to reflect the first THz beam (10) passing through the measuring chamber (7) back to the first THz transceiver (3) along the optical axis (A),
a second THz transceiver (5), designed to output a second THz beam (11) which is polarized in a second polarization plane that is different, in particular orthogonal, from the first polarization plane,
a second polarization mirror (6), designed to reflect the second THz beam (11) passing through the measuring chamber (7) along the optical axis (A) through the measuring chamber (7) back to the second Transceiver (5), wherein the THz beams pass through the respective other polarization mirrors without being substantially influenced,
and the measuring signals (S1, S2) of the THz transceivers (3, 5) are correlated with each other so as to determine layer thicknesses (d1, d2) and/or a refractive index (n) of the tested object (8).

17 Claims, 2 Drawing Sheets

Figure 5:
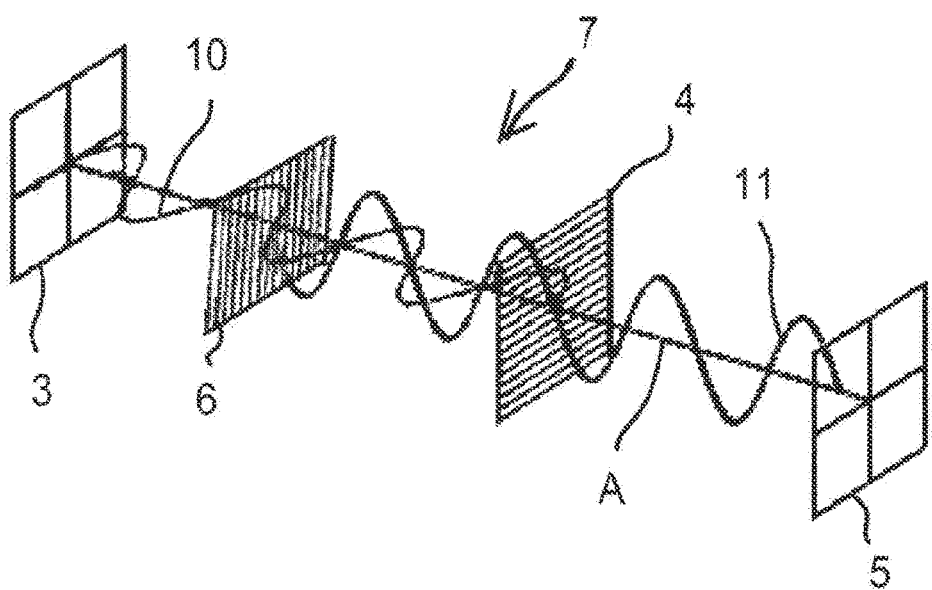

(51) Int. Cl.
      *G01N 21/3563*    (2014.01)
      *G01N 21/3581*    (2014.01)

(56) References Cited

U.S. PATENT DOCUMENTS

| | | | |
|---|---|---|---|
| 2021/0381828 A1* | 12/2021 | Klose | G01S 13/88 |
| 2022/0026372 A1* | 1/2022 | Federici | G01M 3/38 |

FOREIGN PATENT DOCUMENTS

| | | |
|---|---|---|
| DE | 102018118097 | 1/2020 |
| DE | 102018118097 A1 | 1/2020 |
| DE | 102018124175 | 4/2020 |
| DE | 102018124175 A1 | 4/2020 |
| DE | 102018128248 | 5/2020 |
| DE | 102018128248 A1 | 5/2020 |

OTHER PUBLICATIONS

German Office Action for 102020123992.0.
German Search Report for German Patent App. No. DE 10 2020 123 992.0, 1 page.
Inernational (PCT) Search Report for PCT/DE/2021/100761 mailed Dec. 8, 2021, 4 pages.

* cited by examiner

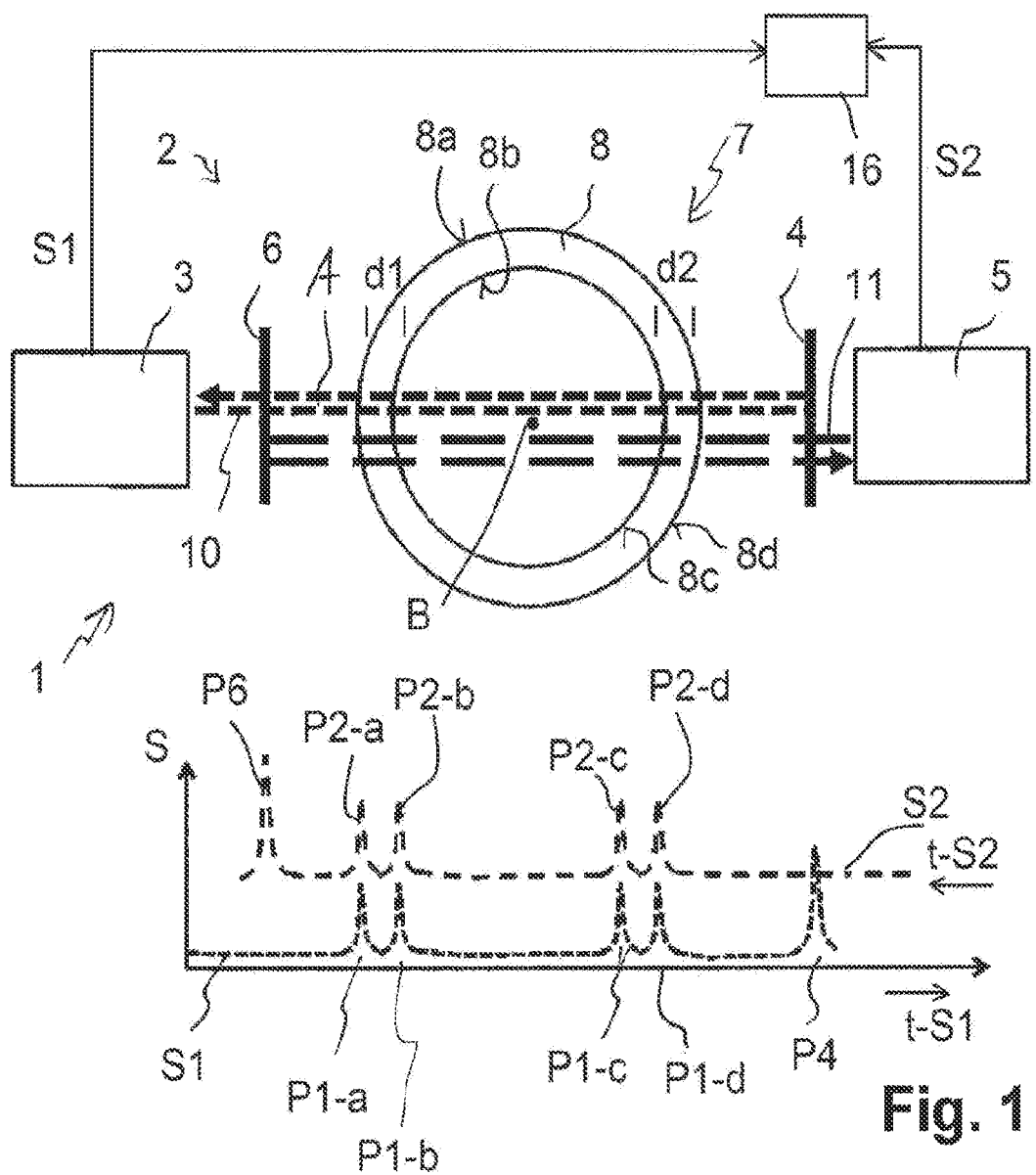
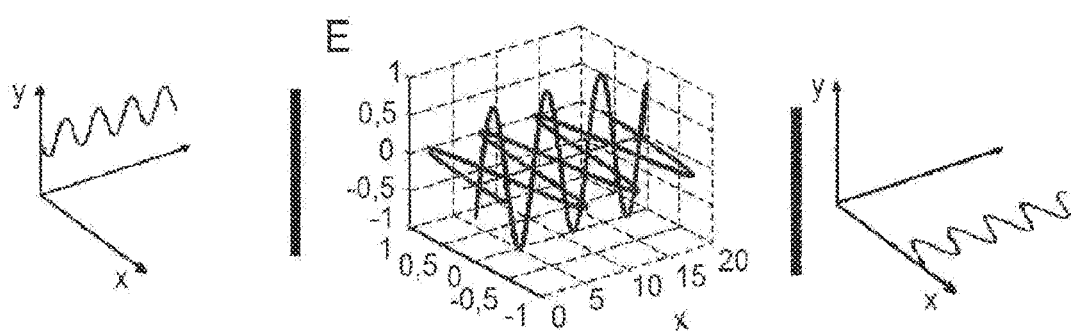
Fig. 2  Fig. 4  Fig. 3

THZ MEASURING DEVICE AND THZ MEASUREMENT METHOD FOR MEASURING TEST OBJECTS, IN PARTICULAR PIPES

CROSS REFERENCE TO RELATED APPLICATIONS

This application is a U.S. national stage application under 35 U.S.C. § 371 (b) of International Application No. PCT/DE2021/100761 filed Sep. 15, 2021, which claims priority to the German Patent Application No. 102020123992.0 filed Sep. 15, 2020, the disclosures of both of which are hereby expressly incorporated by reference in their entirety.

The invention relates to a THz measuring device as well as a THz measuring method for measuring measured objects, in particular, pipes.

In THz measuring devices and THz measuring methods THz radiation emitted by a THz transceiver is guided along an optical axis through a measuring chamber with a tested object contained therein, e.g., a plastic strand or plastic pipe, and detected THz radiation reflected back from the boundary surfaces of the tested object along the optical axis. This allows distances, in particular between boundary surfaces of the tested object, to be determined. From the partial reflection peaks of the THz radiation at the boundary surfaces of the tested object it is possible to subsequently determine e.g., a layer thickness and/or a refractive index of the material.

The transceivers generally emit non-polarized light, i.e., without any preferred direction of the oscillating planes of the electric field force, so as to attain high signal intensities.

The document DE 20 2016 008 526 U1 describes a device for measuring a diameter and/or the wall thickness of a strand essentially circular in cross-section and guided through the device by means of guide means in the longitudinal direction of its longitudinal axis. The device comprises a transmitter for emitting Terahertz radiation, where a beam optics is provided which guides Terahertz radiation emitted from the transmitter towards the strand and a reflector for the Terahertz radiation is arranged opposite the transmitter behind the strand in the direction of radiation. Further, a receiver is provided for receiving the Terahertz radiation reflected from the strand or the reflector.

The citation DE 10 2018 128 248 A1 describes a method of determining the refractive index of a pipe-shaped body, where the body is irradiated in a measuring region by means of a transmitter means using measuring radiation in the Gigahertz or Terahertz frequency band, and measuring radiation reflected on boundary surfaces of the body is detected by a receiver means, and whereby the optical wall thickness of at least one wall section of the body is determined by means of the reflected measuring radiation, whereby the external and internal diameters as well as a refractive index of the body are determined.

The document DE 10 2018 118 097 A1 describes a device for determining the diameters and/or the exterior contours of a strand-shaped object, including at least one transmitter means for emitting measuring radiation which is reflected by the strand-shaped object, and a receiver means for receiving the reflected measuring radiation, whereby the diameter and/or the exterior contours of the strand-shaped object are determined by means of the received measuring radiation. Hereby, at least one retro-reflector surrounding the strand-shaped object at least in certain areas which retro-reflects the reflected measuring radiation in total or in part.

The citation U.S. Pat. No. 10,514,336 B2 describes a THz measuring device for measuring a measured object, wherein THz radiation is emitted at a spatial angle along an optical axis, and reflected THz radiation is received. Hereby, defects of the measured object are determined from the received THz radiation. In particular, it is possible to shield off a core area of the emitted THz radiation.

The document US 2020/0173766 A1 describes a THz measuring device for time-of-flight measuring a measured object, in particular, for conducting layer thickness measurements and distance measurements, whereby THz radiation is emitted and received along an optical axis, whereby a beam splitter is provided for splitting the emitted THz radiation into at least one first partial radiation and second partial radiation having different optical axes. Hereby, a reflection means serves to reflect the second partial radiation along a second partial optical axis which is different from the first partial optical axis of the first partial radiation. Hereby, a common measuring signal is generated from the partial beams and evaluated.

The invention is based on the object of creating a THz measuring device and a THz measuring method allowing for a versatile measuring of a test object.

This task is solved by a THz measuring device and a THz measuring method according to the independent claims. The sub-claims describe preferred further developments. Further provided is a measuring arrangement consisting of a THz measuring device according to the invention and the test object to be measured, in particular, while guided in a continuous process through the measuring chamber of the THz measuring device. The test object may be, in particular, a strand, e.g., pipe or rectangular profile which is guided through the measuring chamber, in particular, perpendicular to the optical axis of the THz transceiver.

The THz measuring method according to the invention can be carried out, in particular, using the THz measuring device according to the invention. The THz measuring device is provided, in particular, for carrying out the THz measuring method according to the invention.

Thus, according to the invention at least two THz transceiver means are provided, each emitting THz radiation of a preferred polarization or polarization plane respectively, i.e. the THz radiation is each polarized totally or predominantly in one plane, the polarization planes being different, in particular, orthogonal in relation to one another.

Thus, two THz transceivers are able to carry out measurement that do not or not significantly affect one another. In particular, the THz transceiver may be arranged opposite one another and emit THz radiation which will not or not to a significant extent be detected by the other THz transceiver.

According to a preferred embodiment, polarized reference surfaces, i.e., reference surfaces acting selectively under polarized radiation are provided in the beam path or, respectively, in the optical axes of the THz transceivers. The reference surfaces sensitive to polarized THz radiation may be, in particular, mirrors reflecting light of a preferred polarization plane while letting pass other polarization planes, in particular, the polarization plane orthogonal thereto. Such a selectively acting polarization mirror may be, in particular, be designed as a metal surface with grooves or lines respectively, which consequentially pass, e.g., THz beams oscillating in one plane but intercept radiation orthogonal thereto.

Thus, according to a preferred embodiment, it is possible to perform measurements on the identical or essentially identical optical axis, i.e., with opposite THz transceivers not affecting one another, whereby the THz radiation is reflected on an associated selective mirror which allows the other THz radiation to pass. The measuring chamber is formed, in particular, between the transceiver and the associated mirror so that the measured object is guided through the measuring chamber, and the first THz radiation travels from the first THz transceiver through the second mirror, then through the measuring chamber with the measured object, reaching the first mirror behind it, and reflected back, and correspondingly vice versa for the second THz radiation of the first THz transceiver.

A measuring arrangement of this type bears the advantage, in particular, that the partial reflection peaks or measuring peaks respectively of the two measurements occur along the same optical axis and on the same boundary surfaces and, thus, the two measurements correspond so that the measuring signals or, respectively, signal amplitudes of the two measurements can be correlated. Thus, for one thing, the two signal amplitudes can be compared to one another so as to carry out averaging. Moreover, e.g., the total reflection peaks of the two measuring signals on the mirrors can be jointly taken into consideration for the evaluation.

Besides polarization mirrors other means reacting selectively to the polarization planes, e.g., filters selectively absorbing only THz radiation of a certain polarization plane.

The method according to the invention may be carried out, in particular, in such a way that the test object is continuously guided through the measuring chamber and measured, in particular, upon being manufactured, e.g., upon extrusion of the tested object.

Hereby, a few advantages are attained. A plurality of measurements can be carried out which do not or not to a significant extent interfere with one another. It is also possible to carry out measurements on the same optical axis from opposite sides, whereby these measuring signals can be jointly evaluated so as to increase precision. Further, it is possible to measure objects and materials acting selectively for polarized THz radiation.

The frequency range of the THz radiation lies e.g., between 10 GHz and 50 THz, e.g., between 20, 30 or 50 GHz and 10 THz or 30 THz. Thus, the THz radiation or, respectively, electromagnetic measuring radiation lies in the GHz or THz band thereby advantageously also including the radar band and the microwave band.

The THz radiation can be output for a direct time-of-flight measurement, frequency modulated measurement and/or as pulsed radiation.

The invention is further illustrated below by means of the attached drawings by means of certain embodiments. It is shown in:

FIG. 1 a measuring arrangement consisting of a measuring device and a pipe as test object, depicting the signal amplitudes of the measuring signals;

FIG. 2 a first polarized electromagnetic wave;

FIG. 3 a second polarized wave oriented orthogonally in relation to FIG. 2;

FIG. 4 a representation of the superimposition of the polarized waves;

FIG. 5 the effect of the polarization mirrors on the THz radiation.

FIG. 1 shows a measuring arrangement 1 comprising a THz measuring device 2 which in turn comprises a first THz transceiver 3 and a first polarization mirror 4 as well as a second THz transceiver 5 and a second polarization mirror 6.

In-between the THz transceivers 3 and 5 as well as the polarization mirrors 4 and 6 a measuring chamber 7 is formed in which a test object, in this case a pipe 8, is received and continuously transported along its pipe axis B, i.e., perpendicular to the plane of the drawing.

The first THz transceiver 3 emits a first THz beam 10 along an optical axis A which is polarized in a first polarization plane and passes through the second polarization mirror 6—substantially without any relevant attenuation. The first THz beam 10 subsequently runs through the measuring chamber 7 and the measured object 8 along the optical axis A, thereby passing through the boundary surfaces 8a through 8d of the tested object 8 creating partial reflection peaks (measuring peaks). Thereafter, the first THz beam 10 reaches the first polarization mirror 4 on which it is reflected, owing to its polarization, back along the optical axis A and again passes through the measuring chamber 7 with the test object 8. Subsequently, the first THz beam 10 runs through the second polarization mirror 6 through which it passes again, owing to its polarization, essentially without significant attenuation, and will subsequently be received by the first THz transceiver 3 which thereupon generates a first signal amplitude S1.

Accordingly, the second THz transceiver 5 outputs a second THz beam 11 running along the optical axis A and in a direction opposite that of the first THz beam 10, i.e., in FIG. 1, from right to left. The second THz beam 11 is polarized again, with a polarization plane orthogonal in relation to the first polarization of the first THz beam 10. Therefore, the second THz beam 11 passes, without any relevant attenuation, through the first polarization mirror 4 thereafter through the measuring chamber 7 and through the boundary surfaces 8a through 8d of the tested object 8 while creating partial reflection peaks (measuring peaks), and, having passed through the measuring chamber 7, strikes the second polarization mirror 6 on which it is reflected, owing to its polarization, and travels along the optical axis A back through the measuring chamber 7, the test object 8, as well as the first polarization mirror 4 and is again detected by the second THz transceiver 5 which thereupon generates a second signal amplitude S2.

Upon passing through the boundary surfaces 8a and 8b of the wall region of the pipe 8 facing it, the first THz beam 10 generates corresponding measuring peaks (signal peaks) P1-a and P1-b in the first signal amplitude S1, then subsequently, having passed the interior space of the pipe 8, upon passing through the boundary surfaces 8c and 8d of the rear wall region of the pipe 8 again corresponding measuring peaks (signal peaks) P1-c, P1-d.

Subsequently, in the first signal amplitude S1 a first total reflection peak P4 is generated by the total reflection on the first polarization mirror 4. Thereafter, upon re-passing through the measuring chamber 7, reflections in the first signal amplitude S1 are generated on the boundary surfaces, which will not be described in further detail at this point.

Accordingly, upon passing through the measuring chamber 7, the second THz beam 11, by partial reflections on the boundary surfaces 8d, 8c, and, upon passing through the interior space of the pipe 8, on the boundary surfaces 8b, 8a generates corresponding measuring peaks (signal peaks) P2-d, P2-c, P2-b and P2-a and, thereafter, upon total reflection on the second polarization mirror 6, again a second total reflection peak P6.

Owing to the different polarization, the first and second measuring signal S1, S2 do not or not to a relevant extent influence one another so that, here, firstly separate measurements on the optical axis A and also on the same wall regions and boundary surfaces can be carried out which do not disturb one another but can be correlated with each other.

The two signal amplitudes S1 and S2 are plotted in the signal diagram of FIG. 1 at the bottom, for illustration purposes, in such a way with opposite temporal directions that the measuring peaks P1-*a* and P2-*a* as well as the further measuring peaks on identical boundary surfaces 8*a* through 8*d* correspond. This illustrates the reflection characteristics on the boundary surfaces 8*a b* through is 8*d* as well as the polarization mirrors 4 and 6.

Here, the respective electrical field E is being viewed for the polarization planes and the reflection characteristics; the magnetic B field extends perpendicular hereto, i.e., substantially in the plane of the electrical field of the respective other THz beam. FIG. 2 and FIG. 3 show electromagnetic radiation or THz radiation with polarization planes perpendicular or orthogonal respectively in relation to one another, FIG. 4 shows the combined path of the two THz beams.

FIG. 5 shows the functioning of the polarization mirrors 4 and 6 while depicting the polarization planes of the THz beams 10 and 11. Thus, the polarization mirrors 4 and 6 are arranged at an angle of 90° in relation to one another and may, in particular, by formed by grooves or lines in a metal surface.

The THz transceivers 3, 5 may be combined or, respectively, integrated transmitters and receivers sein; however, they may also each comprise a transmitter and receiver separately, with semi-transparent mirrors. The THz beams 10, 11 may be output for a direct time-of-flight measurement, frequency modulated measurements and/or pulsed radiation, whereby the polarized radiation in turn is preferably generated by the internal or, respectively, upstream polarization filter provided in the transceivers 3, 5 which allow only THz radiation of the respective polarization to pass.

An evaluation unit 16 show in FIG. 1 receives the first measuring signal S1 of the first THz transceiver 3 and the second measuring signal S2 of the second THz transceiver 5 auf and correlates the measuring signals with each other so as to allow for a common evaluation. To that end, the evaluation unit 16, in particular, according to the schematic representation of the signal amplitudes in FIG. 1, convert the measuring signals S1, S2 into a temporal progression that is inverse to one another, thereby correlating the partial reflection peaks on the boundary surfaces 8*a*, 8*b*, 8*c*, 8*d* with each other.

Thus, it is possible, in the combined measuring signal from the total reflection peaks P4 on the first polarization mirror 4 and P6 on the second polarization mirror 6 to determine even the distance between the polarization mirrors 4 and 6, e.g., for a calibration measurement with an empty measuring chamber 7 and subsequent measurement with a test object 8 contained therein, thereby allowing for a more precise determination of both layer thicknesses and the refractive index.

According to the invention it is possible to determine a layer thickness d1 of the front wall region between the boundary surfaces 8*a* and 8*b*, a layer thickness d2 of the rear wall region between the boundary surfaces 8*c* and 8*d*, and the internal diameter as a layer between the boundary surfaces 8*b* and 8*c*, as well as the refractive index n of the material of the test pipe 8.

Thus, when the refractive index n is known, the layer thicknesses d1, d2 can be determined directly from the temporal distance of the partial reflection peaks of a measuring signal S1 or S2, or even, so as to increase accuracy, from averaged values of these two measurements based on the formula $$d = c8 * \Delta t = c0/n * \Delta t,$$

where d=layer thickness, c0=speed of light in a vacuum, n=refractive index of the material of the pipe 8, c8=speed of light in the material of the test pipe 8, Δt time difference between the measuring peaks, e.g., difference P1-*a* and P1-*b* or P2-*a* and P2-*b*, or from these averaged values. Further, it is also possible to determine the diameter of the interior space of the pipe 8, i.e., the layer between the boundary surfaces 8*b* and 8*c*, as well as the exterior diameter of the pipe 8.

In a measurement with supplementary calibration measurement or, respectively empty measurement, prior to introducing the tested object 8 into the measuring chamber 7, the time of the total reflection peak P4 of the first THz beam 10 on the first reflection mirror 4 and, correspondingly, the time of the total reflection peaks P6 of the second THz beam 11 on the second reflection mirror 6 is determined, and thereafter, with a test pipe 8 contained therein, the time delay of the measuring peaks P4 and P6 in relation to the calibration measurement is determined so as to determine the total temporal delay upon travelling through the wall regions of the tested object 8 so that both layer thicknesses and refraction indexes can be determined from the calibration measurement and the subsequent measurements.

LIST OF REFERENCE NUMERALS 1 measuring arrangement
2 THz measuring device
3 first THz transceiver
4 first polarization mirror
5 second THz transceiver
6 second polarization mirror
7 measuring chamber
8 test object, in this case a pipe
8*a* through 8*d* boundary surfaces, surfaces of the pipe 8
10 first THz beam with first polarization plane
11 second THz beam with second polarization plane
S1 first signal amplitude
S2 second signal amplitude
A optical axis
B pipe axis
P1-*a* through P1-*d* first measuring peaks, partial reflection peaks of the first THz beam 10 on the boundary surfaces 8*a* through 8*d*
P2-*a* through P2-*d* second measuring peaks, partial reflection peaks of the second THz beam 11 on the boundary surfaces

The invention claimed is:

1. A THz measuring device for measuring a test object, in particular a pipe, the THz measuring device comprising:
a first THz transceiver designed to output a first THz beam with a first polarization plane along an optical axis in a first direction through a measuring chamber of the measuring device,
a second THz transceiver designed to emit a second THz beam, polarized in a second polarization plane different from the first polarization plane, along the optical axis,
a first polarization mirror designed to reflect the first THz beam, which has travelled through the measuring chamber along the optical axis, back to the first THz transceiver, and to allow the second THz beam to pass, at least in part,
a second polarization mirror designed to reflect the second THz beam, which has travelled through the measuring chamber, along the optical axis back to the second transceiver, and to allow the first THz beam to pass, at least in part,
an evaluation unit designed to receive a first measuring signal of the first THz transceiver and a second measuring signal of the second THz transceiver, determine first measuring peaks of the first measuring signal and second measuring peaks of the second measuring signal and layer thicknesses and/or a refractive index of the tested object.

2. The THz measuring device of claim 1, wherein the first polarization plane of the first THz beam and the second polarization plane of the second THz beam run orthogonally in relation to one another, and/or a first polarization plane of the first polarization mirror which is active for reflections and a second polarization plane of the second polarization mirror which is active for reflections run orthogonally in relation to one another.

3. The THz measuring device of claim 1, wherein the first beam direction of the first THz beam and a second beam direction of the second THz beam are opposite, and/or the first THz transceiver and the second THz transceiver are arranged opposite one another with the measuring chamber in-between them.

4. The THz measuring device of claim 3, wherein the first polarization mirror is arranged between the second THz transceiver and the measuring chamber, and/or the second polarization mirror is arranged between the first THz transceiver and the measuring chamber.

5. The THz measuring device of claim 1, wherein in addition to the first and second THz transceivers, further THz transceivers are provided, directed along further optical axes, in particular centrally through an axis of symmetry or a middle region of the measuring chamber.

6. The THz measuring device of claim 1, wherein the first and second THz beams are formed in overlapping or identical frequency bands, in particular, between 10 GHz and 50 THz, preferably between 50 GHz and 10 THz, e.g., between 50 GHz and 4 THz, in particular, as a direct time-of-flight measurement, for frequency modulated measurements and/or pulsed radiation.

7. The THz measuring device of claim 1, wherein the evaluation unit correlates the two measuring signals with each other, e.g., correlates corresponding first and second measuring peaks of the two measuring signals with each other and/or carries out an averaging across measuring peaks or across time differences between measuring peaks of the two measuring signals, that correspond to identical layer thicknesses.

8. The THz measuring device of claim 7, wherein the evaluation unit is designed to, control the THz transceiver for carrying out measurements coordinated with one another, and/or trigger a calibration measurement of both THz transceivers without a test object contained inside, and to correlates this with the subsequent measurement of the test object, so as to determine both layer thicknesses and a refractive index.

9. A measuring arrangement consisting of a THz measuring device according to claim 1 and a test object received in the measuring chamber, in particular a profile, e.g., rectangular profile, or pipe, made of a material at least partially transparent for the THz beam, e.g., plastics, paper, organic material, or rubber.

10. The measuring arrangement of claim 9, wherein the test object comprises at least one region transparent for THz radiation of different polarizations.

11. The measuring arrangement of claim 9, further comprising a conveyor means is provided for transporting the tested object through the measuring chamber in a direction orthogonal to the optical axis, for continuous temporal measuring of the tested object.

12. A THz measuring method for measuring a test object, in particular a pipe, including the following steps:

emitting a first THz beam which is polarized in a first polarization plane along an optical axis through a measuring chamber with a test object and subsequently to a first polarization mirror, on which the first THz beam is reflected back along the optical axis, along the optical axis through the measuring chamber and towards the first THz transceiver which outputs a first measuring signal, at the same time or at least partially overlapping in time, putting out a second THz beam which is polarized in a second polarization plane unequal to the first polarization plane, from a second THz transceiver along the optical axis through the measuring chamber with the test object and towards a second polarization mirror which reflects the second THz beam back along the optical axis towards the second THz transceiver which outputs a second measuring signal, evaluating the first measuring signal and the second measuring signal, where at least one layer thickness and/or a refractive index of the tested object is determined.

13. The THz measuring method of claim 12, wherein the first THz beam and the second THz beam are output in opposite beam directions along the optical axis.

14. The THz measuring method of claim 12, wherein the first polarization plane of the first THz beam runs orthogonal in relation to the second polarization plane of the second THz beam.

15. The THz measuring method of claim 12, wherein the first THz beam output by the first THz transceiver first passes through the second polarization mirror and subsequently through the measuring chamber with the test object, and the second THz beam output by the second THz transceiver first passes through the first polarization mirror and subsequently through the measuring chamber with the test object, wherein the first polarization beam is not or not to a relevant extent reflected on the second polarization mirror due to the first polarization plane, and whereby the second polarization beam is not or not to a relevant extent reflected on the first polarization mirror due to the second polarization plane.

16. The THz measuring method of claim 12, wherein the two measuring signals are evaluated together, whereby the measuring signals are correlated with each other.

17. The THz measuring method of claim 16, wherein the first measuring signal first partial reflection peaks of the first THz beam at boundary layers of the tested object are detected or determined, and a main reflection peak on the first polarization mirror is detected or determined, and correspondingly, in the second measuring signal second partial reflection peaks at the boundary surfaces of the tested object and a main reflection peak on the second polarization mirror are detected, and at least certain one of the partial reflection peaks of the two measuring signals are correlated with each other or equated, in particular, for averaging a layer thickness from the two measurements.

* * * * *